(12) United States Patent
Guo et al.

(10) Patent No.: US 11,984,589 B2
(45) Date of Patent: May 14, 2024

(54) POSITIVE-ELECTRODE PLATE AND MANUFACTURING METHOD THEREOF, LITHIUM-ION SECONDARY BATTERY, BATTERY MODULE, BATTERY PACK, AND APPARATUS

(71) Applicant: Contemporary Amperex Technology Co., Limited, Ningde (CN)

(72) Inventors: Mingkui Guo, Ningde (CN); Yaohui Wang, Ningde (CN); Yaping Huang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 837 days.

(21) Appl. No.: 17/044,289

(22) PCT Filed: Oct. 15, 2019

(86) PCT No.: PCT/CN2019/111205
§ 371 (c)(1),
(2) Date: Sep. 30, 2020

(87) PCT Pub. No.: WO2020/083068
PCT Pub. Date: Apr. 30, 2020

(65) Prior Publication Data
US 2021/0083280 A1 Mar. 18, 2021

(30) Foreign Application Priority Data
Oct. 23, 2018 (CN) .......................... 201811238060.1

(51) Int. Cl.
*H01M 4/50* (2010.01)
*H01M 4/04* (2006.01)
(Continued)

(52) U.S. Cl.
CPC ......... *H01M 4/505* (2013.01); *H01M 4/0404* (2013.01); *H01M 4/131* (2013.01);
(Continued)

(58) Field of Classification Search
None
See application file for complete search history.

(56) References Cited

U.S. PATENT DOCUMENTS

| | | | | |
|---|---|---|---|---|
| 2012/0328942 A1* | 12/2012 | Thomas-Alyea | ..... | H01M 4/587 429/211 |
| 2014/0205898 A1* | 7/2014 | Lee | ..... | H01M 4/1391 427/126.6 |

(Continued)

FOREIGN PATENT DOCUMENTS

| | | |
|---|---|---|
| CN | 101872860 A | 10/2010 |
| CN | 102324493 A | 1/2012 |

(Continued)

OTHER PUBLICATIONS

The extended European search report for EP Application No. 19875359.2, dated Jul. 8, 2021, 7 pages.

(Continued)

*Primary Examiner* — Maria Laios
*Assistant Examiner* — Angela J Martin
(74) *Attorney, Agent, or Firm* — East IP P.C.

(57) ABSTRACT

This application provides a positive-electrode plate, including a current collector, and a first active substance layer and a second active substance layer that are sequentially disposed on a surface of the current collector. The first active substance layer includes a first positive-electrode active material, and the first positive-electrode active material includes at least one of a compound represented by Formula (I) $Li_{1+x1}Mn_{a1}M_{1-a1}O_{2-y1}A_{y1}$ or a compound represented by Formula (II) $Li_{1+x2}Mn_{a2}N_{2-a2}O_{4-y2}B_{y2}$. The second active (Continued)

substance layer includes a second positive-electrode active material having a pH value of from 10~12. In this application, the active substance layer that includes high-pH positive-electrode active material is disposed outside the active substance layer that includes a lithium manganese-based positive-electrode active material, so as to make a layered electrode plate.

19 Claims, 3 Drawing Sheets

(51) Int. Cl.
    *H01M 4/13*         (2010.01)
    *H01M 4/131*       (2010.01)
    *H01M 4/1391*     (2010.01)
    *H01M 4/36*         (2006.01)
    *H01M 4/505*       (2010.01)
    *H01M 4/52*         (2010.01)
    *H01M 4/525*       (2010.01)
    *H01M 4/58*         (2010.01)
    *H01M 10/05*       (2010.01)
    *H01M 10/0525*     (2010.01)
    *H01M 4/02*         (2006.01)

(52) U.S. Cl.
    CPC ......... *H01M 4/1391* (2013.01); *H01M 4/366* (2013.01); *H01M 4/525* (2013.01); *H01M 4/5825* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 2016/0301063 | A1 | 10/2016 | Yukinobu et al. |
| 2017/0018770 | A1* | 1/2017 | Hori .................... H01M 4/0404 |

FOREIGN PATENT DOCUMENTS

| | | | | |
|---|---|---|---|---|
| CN | 102792491 | A | 11/2012 | |
| CN | 103400978 | A | 11/2013 | |
| CN | 103474647 | A | 12/2013 | |
| CN | 103633291 | A | 3/2014 | |
| CN | 104638227 | A | 5/2015 | |
| CN | 104868114 | A | 8/2015 | |
| CN | 105161717 | A | 12/2015 | |
| CN | 204947009 | U | 1/2016 | |
| CN | 106602021 | A | 4/2017 | |
| CN | 107275574 | A | 10/2017 | |
| CN | 107799764 | A | 3/2018 | |
| CN | 107994206 | * | 5/2018 | ........ H01M 10/0525 |
| CN | 107994206 | A | 5/2018 | |

OTHER PUBLICATIONS

PCT International Search Report for PCT/CN2019/111205, dated Feb. 5, 2020, 8 pages.
The First Office Action and search report dated Sep. 2, 2020 for Chinese Application No. 201811238060.1, 10 pages.
The second Office Action and search report dated Nov. 20, 2020 for Chinese Application No. 201811238060.1, 8 pages.

* cited by examiner

POSITIVE-ELECTRODE PLATE AND MANUFACTURING METHOD THEREOF, LITHIUM-ION SECONDARY BATTERY, BATTERY MODULE, BATTERY PACK, AND APPARATUS

CROSS-REFERENCE TO RELATED APPLICATION

This application is a National Stage of International Application No. PCT/CN2019/111205, filed on Oct. 15, 2019, which claims priority to Chinese Patent Application No. 201811238060.1, filed with the National Intellectual Property Administration, PRC on Oct. 23, 2018, both of which are incorporated herein by reference in their entireties.

TECHNICAL FIELD

This application relates to the technical field of lithium-ion batteries, and in particular, to a positive-electrode plate and a manufacturing method thereof, a lithium-ion secondary battery that includes the positive-electrode plate, a battery module, a battery pack, and an apparatus.

BACKGROUND

Recently, demands in a power battery market are increasing, and power batteries need to be more cost-effective. A positive-electrode material accounts for a highest percentage of costs in a battery cell. Therefore, a problem of costliness of a battery cell may be solved from a perspective of the positive-electrode material. Currently, lithium manganese oxide (LMO) used in the positive-electrode material is relatively cheap. In the case that the LMO is effectively applied in the battery cell, the costs of the battery cell will be reduced significantly. However, a considerable metal release problem occurs no matter whether the LMO is used separately or mixed, and the problem is even severer at a high temperature and leads to deterioration of high-temperature performance (including cycling performance and storage performance) to a great extent. Consequently, the application of the battery cell that includes the LMO is limited and massive application of the battery cell is very difficult. A conventional solution to this problem is mainly approached from a perspective of an electrolyte. However, the electrolyte brings other adverse effects such as an excessive impedance, and deteriorates other performance while improving the high-temperature performance of the lithium-ion battery that includes the LMO. Therefore, the conventional solution has limitations. A new solution to this problem needs to be put forward.

SUMMARY

Considering the problems in the Background, an objective of this application is to provide a technical solution for improving high-temperature performance of a lithium-ion secondary battery that includes LMO, so as to improve the high-temperature performance and reduce costs of battery cell in the lithium-ion secondary battery without deteriorating power performance.

A first aspect of this application provides a positive-electrode plate. The positive-electrode plate includes a current collector, and a first active substance layer and a second active substance layer that are sequentially disposed on a surface of the current collector.

The first active substance layer includes a first positive-electrode active material, and the first positive-electrode active material includes at least one of a compound represented by Formula (I) or a compound represented by Formula (II):

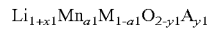

$$Li_{1+x1}Mn_{a1}M_{1-a1}O_{2-y1}A_{y1} \qquad \text{Formula (I)}$$

where $-0.1 \leq x1 \leq 0.2$, $0.5 \leq a1 \leq 1$, $0 \leq y1 \leq 0.2$, M includes one or more of Ni, Fe, Cr, Co, Ti, Zn, V, Al, Zr, and Ce, and A includes one or more of S, N, F, Cl, Br, and I;

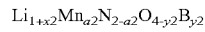

$$Li_{1+x2}Mn_{a2}N_{2-a2}O_{4-y2}B_{y2} \qquad \text{Formula (II)}$$

where $-0.1 \leq x2 \leq 0.2$, $1.5 \leq a2 \leq 2$, $0 \leq y2 < 0.5$, N includes one or more of Ni, Fe, Cr, Co, Ti, Zn, V, Al, Zr, and Ce, and B includes one or more of S, N, F, Cl, Br, and I.

The second active substance layer includes a second positive-electrode active material having a pH value of from 10 to 12; preferably, the second positive-electrode active material is a lithium-transition metal composite oxide or a lithium-transition metal composite phosphate having a pH value of from 10 to 12.

In the positive-electrode plate of this application, the first active substance layer disposed on the surface of the positive-electrode current collector includes a lithium manganese-based positive-electrode active material or a spinel-structured LMO. Under a high temperature, due to hydrofluoric (HF) corrosion in an electrolyte, Mn is plentifully released and deposited on a surface of a negative-electrode membrane, thereby affecting intercalation and deintercalation of lithium ions into and out of a negative electrode and affecting high-temperature cycling performance. In this application, the second positive-electrode active substance layer with a high pH value is disposed on the surface of the first active substance layer to neutralize a part of free acids in the electrolyte so as to protect a lithium manganese-based oxide in the first active substance layer. The second positive-electrode active material has certain capacity, and therefore, can ensure a relatively high energy density of the battery while mitigating the problem of releasing an inner-layer active substance Mn.

In a preferred embodiment of the positive-electrode plate in this application, the second positive-electrode active material is selected from one or more of lithium iron phosphate, lithium manganese iron phosphate, lithium cobalt oxide, lithium nickel oxide, lithium manganese oxide, lithium nickel manganese oxide, lithium nickel cobalt manganese oxide, or lithium nickel cobalt aluminum oxide. Further, the second positive-electrode active material may also be a compound obtained by adding, in the second positive-electrode active material, other transition metal elements, non-transition metal elements, or non-metal elements than constituent elements of the second positive-electrode active material. The other transition metal elements are one or more of Ni, Fe, Co, Zr, Cr, Ti, Zn, and V. The non-transition metal elements are one or more of Al and Ce. The non-metal elements are one or more of S, N, F, Cl, Br, and I.

In an embodiment of the positive-electrode plate in this application, the second positive-electrode active material includes a coating layer disposed on a surface of the second positive-electrode active material. The coating layer has a material selected from one or more of boron oxide, zirconium oxide, titanium oxide, aluminum oxide, magnesium oxide, or zinc oxide.

In an embodiment of the positive-electrode plate in this application, the second positive-electrode active material includes a compound represented by Formula (III):

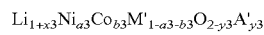

$$Li_{1+x3}Ni_{a3}Co_{b3}M'_{1-a3-b3}O_{2-y3}A'_{y3} \qquad \text{Formula (III)}$$

where $-0.1 \leq x3 \leq 0.2$, $0.5 \leq a3 \leq 1$, $0<b3<0.5$, $0.7 \leq a3+b3<1$, $0 \leq y3<0.2$, M' includes one or more of Mn, Fe, Cr, Ti, Zn, V, Al, Zr, and Ce, and A' includes one or more of S, N, F, Cl, Br, and I.

In this embodiment, the second positive-electrode active material is a nickel-cobalt-manganese (NCM) material that has a relatively high nickel content. That is because some residual lithium exists on a surface of a high-nickel-content material, making the overall material meta-alkaline. Appropriate alkaline treatment brings few effects on the performance of the compound represented by Formula (III). In addition, the compound represented by Formula (III) has a relatively high capacity per gram, and advantageously improves the overall energy density of battery cell while being used together with the LMO of a lower capacity per gram.

Preferably, in the positive-electrode plate of this application, a ratio of mass m1 of the first positive-electrode active material per unit area in the first active substance layer to mass m2 of the second active material per unit area in the second active substance layer satisfies: $1<m1/m2 \leq 19$. In the case that mass ratio of the first active substance layer to the second active substance layer in the positive-electrode plate falls within the above range, a relative content of an alkaline active material in the active substance layer outside the electrode plate is moderate, thereby reducing the possibility of too high water content in the battery which deteriorates gas generation problem. In addition, this can suppress a corrosion effect caused by the free acids in the electrolyte onto the lithium manganese-based oxide in the first active substance layer, and effectively mitigate the problem of releasing Mn ion during battery cycles.

Preferably, in the positive-electrode plate in this application, a specific surface area BET2 of the second positive-electrode active material is not lower than a specific surface area BET1 of the first positive-electrode active material. Further preferably, $1.2 \leq BET2/BET1 \leq 2$. A meta-alkaline active substance in the second active substance layer has a higher BET (Brunner-Emmet-Teller) specific surface area, and has a larger surface area for reacting with the free acids in the electrolyte, thereby achieving an effect of rapid neutralization and preventing the free acids from going deeper into the first active substance layer of the electrode plate.

Preferably, in the positive-electrode plate of this application, the first active substance layer and the second active substance layer satisfy: $P2*T2 \geq P1*T1$, where P1 and P2 represent a porosity of the first active substance layer and a porosity of the second active substance layer respectively, and T1 and T2 represent a thickness of the first active substance layer and a thickness of the second active substance layer respectively. By defining the foregoing relationship for a product of the porosity and the thickness values of the first active substance layer and the second active substance layer of the positive-electrode plate, a space for the second active substance layer to accommodate the electrolyte is larger than a space for the first active substance layer to accommodate the electrolyte. In this way, the electrolyte can advantageously be in full contact with the alkaline active material in an outer layer, and the free acids are neutralized at a higher speed without affecting ion transmission, thereby ensuring excellent dynamic performance of the battery.

A second aspect of this application provides a manufacturing method of the positive-electrode plate as described in this application. The method includes the following steps:

(1) adding a first positive-electrode active material, a conductive agent, and a binder into an organic solvent, stirring for 60 to 180 minutes with a stirring linear speed controlled within a range of 4 m/min to 12 m/min, and homogeneously mixing to obtain a slurry marked as slurry A;

(2) adding a second positive-electrode active material having a pH value of from 10 to 12, a conductive agent, and a binder into an organic solvent system, and stirring for 60 to 180 minutes with a stirring linear speed controlled within a range of 4 m/min to 12 m/min, and homogeneously mixing to obtain a slurry marked as slurry B; and (3) coating a positive-electrode current collector with the slurry A to form a first active substance layer, coating the slurry A with the slurry B to form a second active substance layer, and then drying, cold calendering, slitting, and cutting to obtain the positive-electrode plate.

In the method described in this application, the conductive agent and the binder in step (1) may be the same as or different from those in step (2). Without being specifically limited, the types of the conductive agent and the binder may be selected according to actual needs. For example, the conductive agent may be one or more of graphite, superconducting carbon, acetylene black, carbon black, Ketjen black, carbon dots, carbon nanotubes, graphene, or carbon nanofibers; and the binder may be one or more of styrene-butadiene rubber (SBR), water-based acrylic resin, carboxymethyl cellulose (CMC), polyvinylidene fluoride (PVDF), polytetrafluoroethylene (PTFE), polyvinyl butyral (PVB), ethylene-vinyl acetate copolymer (EVA), and polyvinyl alcohol (PVA).

In the method described in this application, the organic solvent in step (1) or step (2) is not specifically limited. Preferably, the organic solvent described in step (1) or step (2) is selected from at least one of N-methylpyrrolidone (NMP), dimethylformamide (DMF), or tetrahydrofuran.

In the method described in this application, the second positive-electrode active material may be purchased or self-made. For a purchased second positive-electrode active material, in the case that the pH value is greater than 12, a pH value of powder is adjusted to the range of 10 to 12 through weak acid treatment (for example, using at least one of acetic acid or carbonic acid), water washing, and coating treatment. In the case that the pH value is less than 10, the purchased second positive-electrode active material is mixed and sintered with an alkaline lithium salt (for example, at least one of LiOH, $LiHCO_3$, or $Li_2CO_3$) to increase the pH value to the range of 10~12. For a self-made second positive-electrode active material, the pH value is controlled within the range of 10~12 by controlling a ratio of mass of lithium hydroxide to mass of an active substance precursor.

In the method of this application, a method for measuring the pH value is as follows: at 25° C., adding 5 g of a purchased or self-made second positive-electrode active material into 500 ml of deionized water, stirring at a speed of 30 r/min for 2 hours by using a magnetic stirrer, placing the mixture into an ultrasonic cleaner to perform ultrasonic treatment for 2 hours, setting aside a homogeneously dispersed solution for 1 hour, and then measuring the pH value of the solution by using a pH tester.

In an embodiment of the method in this application, the second positive-electrode active material may be synthesized in a high-temperature solid-phase manner. For example, the second positive-electrode active material is manufactured in the following way: mixing precursors manganese nitrate, nickel nitrate, cobalt nitrate, and lithium nitrate, adding LiOH, stirring and mixing at a temperature of 400° C.~600° C., and then high-temperature sintering at a temperature of 800° C.~1000° C. to obtain a second positive-electrode active material having a pH value of from 10~12.

A third aspect of this application further provides a lithium-ion secondary battery, including a casing, a positive-electrode plate, a negative-electrode plate, a separator, and an electrolyte. The positive-electrode plate is the positive-electrode plate as described in this application.

In the lithium-ion secondary battery of this application, a negative-electrode active material of the negative-electrode plate is selected from one or more of soft carbon, hard carbon, artificial graphite, natural graphite, silicon, silicon oxide compound, silicon carbon composite, lithium titanate, or a metal capable of forming an alloy with lithium. The electrolyte includes an organic solvent and a lithium salt. The organic solvent is one or more of ethylene carbonate, propylene carbonate, dimethyl carbonate, diethyl carbonate, ethyl methyl carbonate, or another organic carbonate. The lithium salt is one or more of $LiPF_6$, $LiBF_4$, LiBOB, $LiAsF_6$, $Li(CF_3SO_2)_2N$, $LiCF_3SO_3$, or $LiClO_4$. The separator may be made from an electrochemically stable material, such as one or more of polyethylene, polypropylene, a non-woven fabric, or polyvinylidene fluoride.

A fourth aspect of this application provides a battery module, including the lithium-ion secondary battery disclosed in the third aspect of this application.

A fifth aspect of this application provides a battery pack, including the battery module disclosed in the fourth aspect of this application.

A sixth aspect of this application provides an apparatus, including the lithium-ion secondary battery described in the third aspect of this application. The lithium-ion secondary battery is used as a power supply of the apparatus.

Preferably, the apparatus includes a mobile device, an electric vehicle, an electric train, a satellite, a ship, and an energy storage system.

Compared with the prior art, this application achieves at least the following beneficial effects:

In this application, a layered electrode plate is prepared by coating an active substance layer that includes a lithium manganese-based positive-electrode active material with a high-pH positive-electrode active material. In this way, the release of metal of the lithium manganese-based positive-electrode active material is greatly reduced without affecting the power performance of battery cell, thereby improving the high-temperature performance of the battery cell.

The battery module, the battery pack, and the apparatus in this application include the lithium-ion secondary battery, and therefore, have at least the same advantages as the lithium-ion secondary battery.

Figure 1:
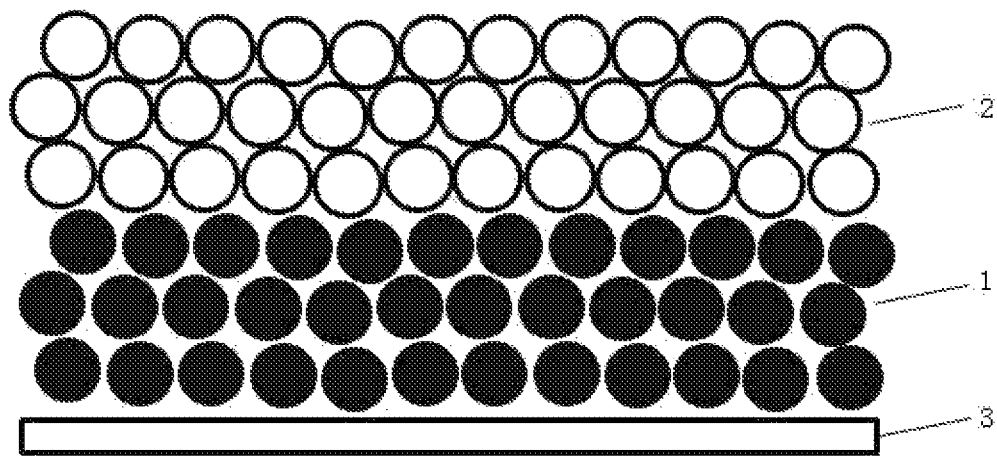
FIG. 1 is a schematic diagram of a positive-electrode plate according to this application, where the positive-electrode plate includes a current collector 3 and a first active substance layer 1 and a second active substance layer 2 that are coated on the current collector 3.
Figure 2:
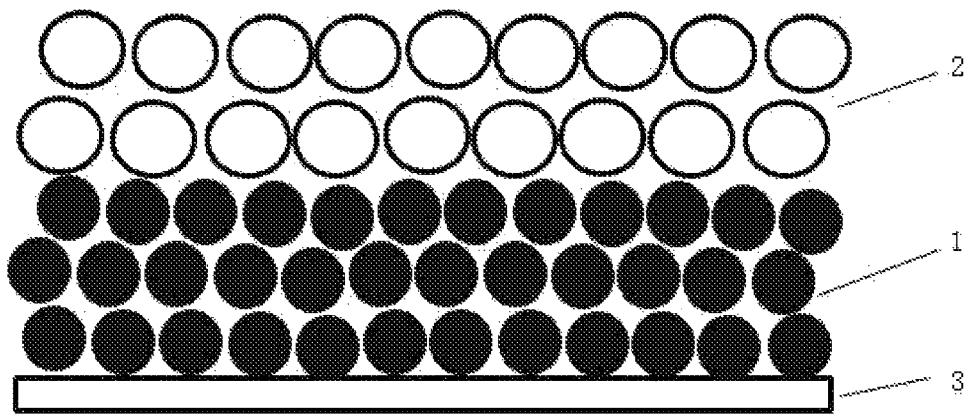
FIG. 2 shows an embodiment of a positive-electrode plate according to this application, where a product of a porosity and a thickness of a second active substance layer 2 is greater than a product of a porosity and a thickness of a first active substance layer 1.
Figure 3:
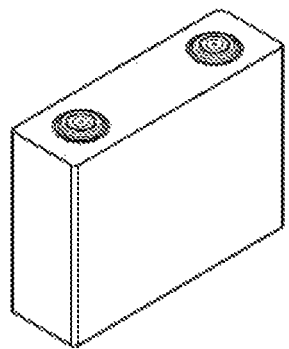
FIG. 3 is a schematic diagram of an implementation of a lithium-ion secondary battery according to this application.
Figure 4:
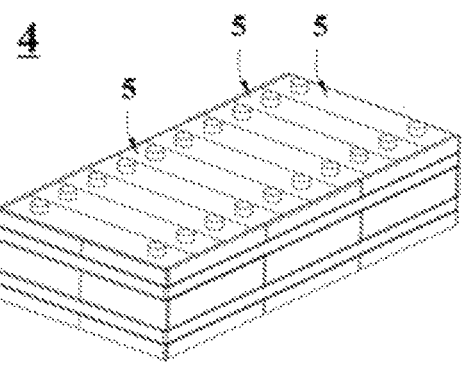
FIG. 4 is a schematic diagram of an implementation of a battery module according to this application.
Figure 5:
FIG. 5 is a schematic diagram of an implementation of a battery pack according to this application.
Figure 6:
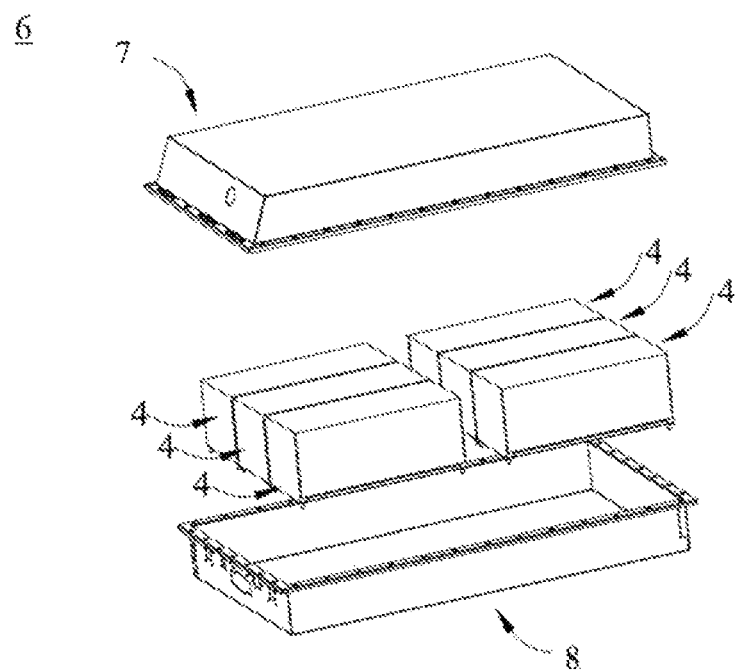
FIG. 6 is an exploded view of FIG. 5.
Figure 7:
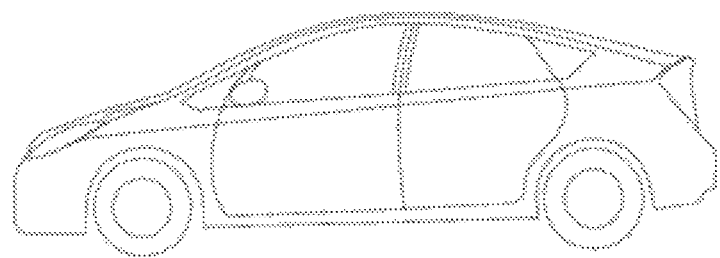
FIG. 7 is a schematic diagram of an implementation of an apparatus using a secondary battery as a power supply according to this application.

In the drawings, reference numerals are indicated as follows:

1: First active substance layer;
2: Second active substance layer;
3: Current collector;
4: Battery module;
5: Lithium-ion secondary battery;
6: Battery pack;
7: Upper cabinet body;
8: Lower cabinet body.

DESCRIPTION OF EMBODIMENTS

The following further describes this application with reference to Examples and Comparative Examples. Examples are merely intended to illustrate this application, and this application is not limited to the following Examples. Any modification or equivalent replacement made to the technical solutions of this application without departing from the scope of the technical solutions of this application shall fall within the protection scope of this application.

Example 1

(1) Preparation of a Second Positive-Electrode Active Material:

Ternary precursor $[Ni_{0.8}Co_{0.1}Mn_{0.1}](OH)_2$ and lithium hydroxide were added into a high-speed mixer, in a molar ratio of the ternary precursor to lithium hydroxide of 1.05, followed by stirring and mixing at a temperature of 400° C.~600° C. Then the mixture was high-temperature sintered at 800° C.~1000° C., followed by high-speed ball milling, to obtain a second positive-electrode active material.

(2) Test of pH Value of the Second Positive-Electrode Active Material:

pH value of the second positive-electrode active material was tested with a pH meter.

A solution to be tested was prepared by the following steps: adding 5 g of the second positive-electrode active material into to 500 ml of deionized water, stirring at a speed of 30 r/min for 2 hours by using a magnetic stirrer, placing into an ultrasonic cleaner to perform ultrasonic treatment for 2 hours, and setting aside a homogeneously dispersed solution for 1 hour to obtain the solution to be tested.

A pH test was performed by the following steps: mounting a composite glass electrode on the pH meter, turning on a power switch of the pH meter, and shifting to a pH measurement position; measuring a temperature of a pH 6.86 standard solution with a thermometer, and adjusting a temperature compensation button of the pH meter to the testing temperature of 25° C.; rinsing the composite electrode clean with deionized water, and drying the composite electrode with filter paper; pouring 2 ml~5 ml of the pH 6.86 standard solution into a plastic beaker that had been washed clean with water and wiped dry, so as to wash the beaker and the composite electrode, and then pouring the standard solution away; adding 20 ml of a pH 6.86 standard solution into the plastic beaker, inserting the composite electrode into the solution, and adjusting a positioning button of the pH meter until a pH reading was adjusted to 6.86 steadily; washing the composite electrode clean with deionized water, and drying the composite electrode with filter paper; measuring a temperature of a pH 4.00 solution with the thermometer, and adjusting a temperature compensation button of the pH meter to the measured temperature value; pouring 2 ml~5 ml of the pH 4.00 standard solution into another plastic beaker, washing the beaker and the composite electrode, and pouring away washing solution; adding 20 ml of the pH 4.00 standard solution, inserting the composite electrode into the solution, and adjusting, after the reading is stable, a slope button to pH 4.00; measuring the temperature of the solution to be tested with the thermometer, and adjusting the temperature compensation button of the pH meter to the measured temperature; and inserting the composite electrode into the solution to be tested, and reading the pH value, i.e. the pH value of the solution to be tested.

(3) Preparation of a Positive-Electrode Plate:

A positive-electrode plate was prepared by the following steps: fully stirring and mixing an LMO, a conductive carbon black Super-P, and a binder PVDF at a mass ratio of 95:2:3 in an N-methylpyrrolidone solvent system for 60 min~180 min, with a stirring linear speed controlled within 4 m/min~12 m/min, and a slurry obtained after homogeneous mixing was marked as slurry A; fully stirring and mixing NCM811, a conductive carbon black Super-P, and a binder PVDF at a mass ratio of 95:2:3 in an N-methylpyrrolidone solvent system for 60 min~180 min, with a stirring linear speed controlled within 4 m/min~12 m/min, and a slurry obtained after homogeneous mixing was marked as slurry B; coating an aluminum foil with the slurry A to obtain a first active substance layer, where a coating weight was controlled to be 90% of the total coating weight; coating the first active substance layer with the slurry B, where a coating weight was controlled to be 10% of the total coating weight; then drying, cold calendering, slitting, and cutting to obtain a positive-electrode plate.

(4) Preparation of a Negative-Electrode Plate

A negative-electrode plate was prepared by the following steps: fully stirring and homogeneously mixing an active substance artificial graphite, conductive carbon black Super-P, a binder SBR, and a thickener sodium CMC at a mass ratio of 96:1:2:1 in a deionized water solvent system, and coating a copper foil with the solvent system; then drying, cold calendering, slitting, and cutting to obtain a negative-electrode plate.

(5) Preparation of a Battery

PE/PP/PE three-layer porous polymer film was used as a separator.

A battery was prepared by the following steps: sequentially stacking the positive-electrode plate, the separator, and the negative-electrode plate that are prepared according to the above steps, and then winding in a controlled way so that the separator was located between the positive electrode and the negative electrode to isolate them, that the positive electrode, the negative electrode, and the separator had extremely small relative displacement from each other, to obtain a bare core; welding a qualified bare cell onto a top cover through a tab, then encasing, baking, electrolyte filling, formation, and testing capacity. A prepared battery was ready for a power performance test.

Examples 2~20

Batteries in Examples 2~20 were prepared by using the same method as in Example 1. Raw materials and parameters thereof were shown in Table 1.

TABLE 1

| | First active substance layer | | | | | Second active substance layer | | | | | |
| --- | --- | --- | --- | --- | --- | --- | --- | --- | --- | --- | --- |
| | First active material | BET1 g/m² | m1 g/cm² | P1 % | T1 μm | Second active material | pH | BET2 g/m² | m2 g/cm² | P2 % | T2 μm |
| Example 1 | LMO | 0.2 | 150 | 10 | 65 | 811 | 10.0 | 0.23 | 30 | 55 | 13 |
| Example 2 | LMO | 0.2 | 150 | 10 | 65 | 811 | 10.5 | 0.23 | 30 | 55 | 13 |
| Example 3 | LMO | 0.2 | 150 | 10 | 65 | 811 | 11.0 | 0.23 | 30 | 55 | 13 |
| Example 4 | LMO | 0.2 | 150 | 10 | 65 | 811 | 11.5 | 0.23 | 30 | 55 | 13 |
| Example 5 | LMO | 0.2 | 150 | 10 | 65 | 811 | 12.0 | 0.23 | 30 | 55 | 13 |
| Example 6 | LMO | 0.16 | 150 | 10 | 65 | 811 | 11.0 | 0.19 | 30 | 55 | 13 |
| Example 7 | LMO | 0.14 | 150 | 10 | 65 | 811 | 11.0 | 0.22 | 30 | 55 | 13 |
| Example 8 | LMO | 0.12 | 150 | 10 | 65 | 811 | 11.0 | 0.24 | 30 | 55 | 13 |
| Example 9 | LMO | 0.10 | 150 | 10 | 65 | 811 | 11.0 | 0.21 | 30 | 55 | 13 |
| Example 10 | LMO | 0.2 | 150 | 10 | 65 | 811 | 11.0 | 0.28 | 150 | 55 | 65 |
| Example 11 | LMO | 0.2 | 150 | 10 | 65 | 811 | 11.0 | 0.28 | 15 | 55 | 13 |
| Example 12 | LMO | 0.2 | 150 | 10 | 65 | 811 | 11.0 | 0.28 | 10 | 70 | 10 |
| Example 13 | LMO | 0.2 | 150 | 10 | 65 | 811 | 11.0 | 0.28 | 8 | 85 | 8 |
| Example 14 | LMO | 0.2 | 150 | 10 | 65 | 811 | 11.0 | 0.28 | 7.5 | 55 | 7 |
| Example 15 | LMO | 0.2 | 150 | 10 | 65 | 811 | 11.0 | 0.28 | 30 | 30 | 13 |
| Example 16 | $LiMn_{0.5}Ni_{0.5}O_2$ | 0.2 | 150 | 10 | 65 | 811 | 11.0 | 0.28 | 30 | 55 | 13 |
| Example 17 | $LiMn_{1.5}Ni_{0.5}O_2$ | 0.2 | 150 | 10 | 65 | 811 | 11.0 | 0.28 | 30 | 55 | 13 |
| Example 18 | LMO+ $LiMn_{1.5}Ni_{0.5}O_2$ | 0.2 | 150 | 10 | 65 | 811 | 11.0 | 0.28 | 30 | 55 | 13 |

TABLE 1-continued

| | First active substance layer | | | | | Second active substance layer | | | | | |
|---|---|---|---|---|---|---|---|---|---|---|---|
| | First active material | BET1 g/m² | m1 g/cm² | P1 % | T1 μm | Second active material | pH | BET2 g/m² | m2 g/cm² | P2 % | T2 μm |
| Example 19 | LMO | 0.2 | 150 | 10 | 65 | 622 | 11.0 | 0.28 | 30 | 55 | 13 |
| Example 20 | LMO | 0.2 | 150 | 10 | 65 | 523 | 11.0 | 0.28 | 30 | 55 | 13 |
| Comparative Example 1 | LMO | 0.2 | 150 | 10 | 65 | / | / | / | / | / | / |
| Comparative Example 2 | LMO | 0.2 | 150 | 10 | 65 | 811 | 13.0 | 0.28 | 30 | 55 | 13 |
| Comparative Example 3 | LMO | 0.2 | 150 | 10 | 65 | 811 | 9.0 | 0.28 | 30 | 55 | 13 | m1: Mass of the first active substance per unit area in the first active substance layer
m2: Mass of the second active substance per unit area in the second active substance layer
P1: Porosity of the first active substance layer
P2: Porosity of the second active substance layer
T1: Thickness of the first active substance layer
T2: Thickness of the second active substance layer Comparative Example 1

A battery of Comparative Example 1 was prepared by using the same procedure as in Example, except that: a positive-electrode plate had a single-layer positive-electrode active substance layer, and that a positive-electrode active substance was 100% LMO. Specifically, the positive-electrode plate in Comparative Example 1 was prepared by the following steps:
fully stirring and mixing an LMO, a conductive carbon black Super-P, and a binder PVDF at a mass ratio of 95:2:3 in an N-methylpyrrolidone solvent system, and for 60 min~180 min, with a stirring linear speed controlled within 4 m/min~12 m/min; coating an aluminum foil with a slurry obtained after homogeneously mixing, and then drying, cold calendering, slitting, and cutting to obtain a positive-electrode plate.

Comparative Example 2

A battery of Comparative Example 2 was prepared by using the same procedure as in Example 1, except that: a pH value of a second active substance in a positive-electrode plate was 13.

Comparative Example 3

A battery of Comparative Example 3 was prepared by using the same procedure as in Example 1, except that: a pH value of a second active substance in a positive-electrode plate was 9.

Five batteries manufactured in each of Examples 1~20 and Comparative Examples 1~3 were sampled under the same conditions. A charge and discharge test was performed on the lithium-ion batteries through the steps below, and then battery cells were disassembled and negative-electrode plates were taken out. Metal deposition amounts of the negative-electrode plates were tested and statistically analyzed. The deposition amounts of the metal Mn were reported compared.

Three batteries manufactured in each of Examples 1~20 and Comparative Examples 1~3 were sampled under the same conditions. A high-temperature cycling performance test and a high-temperature storage performance test were performed on the lithium-ion batteries through the steps below. The quantity of cycles and the quantity of storage days of different battery cells at an end of life (EOL) were reported and compared for cycling performance and storage performance.

(1) Metal Deposition Test

A metal deposition test in Examples 1~20 and Comparative Examples 1~3 were performed by the following steps:
performing at the first time, at a normal atmospheric temperature, a charge and discharge of a manufactured lithium-ion battery with a 0.5 C-rate current (that is, a current value with which a theoretical capacity is fully discharged within 2 hours), where a constant current and a constant voltage, a 4.2V cut-off voltage, and a 0.05 C-rate cut-off current were applied during the charge, and a 2.8V cut-off voltage was applied during the discharge; setting aside the battery for 24 hours, and charging the battery to 4.2V with a 0.5 C-rate constant current and a constant voltage; discharging the full-capacity battery with a 1 C-rate current, where the cut-off voltage during the discharge was uniformly 2.8V; disassembling the battery cell, taking out the negative-electrode plate, and testing the deposition of the metal Mn by using an inductively coupled plasma (ICP) method. Test results of negative-electrode metal deposition in Examples 1~20 and Comparative Examples 1~3 were shown in Table 2.

(2) A High-Temperature Cycling Performance Test and a Storage Performance Test by the Following Steps:
performing a charge and discharge test first under the same conditions, and recording a discharge capacity Cb at a beginning of life (BOL), that is, in an initial cycle, of each battery cell; performing a high-temperature cycle life test under a condition of 45° C., performing 1 C/1 C cycles, and recording the 1 C-rate discharge capacity Ce of the battery cell at all times, where a ratio of Ce to Cb was a capacity retention rate in a cycling process; stopping the test when the capacity retention rate was lower than or equal to 80%, in which case it was considered as the EOL; and recording the quantity of cycles of the battery cell at the EOL, where the quantity of cycles was used to determine a cycle life; and
performing a high-temperature storage life test under a condition of 45° C., performing storage at a 100% state of charge (SOC), and testing and recording the discharge capacity Ce of the battery cell every 30 days, where a ratio of Ce to Cb was a capacity retention rate in a storage process; stopping the test when the capacity retention rate was lower than or equal to 80%, in which case it was considered as the EOL; and recording the quantity of storage days of the battery cell at the EOL, where the quantity of storage days was used to determine a storage life.

Test results of the deposition of the metal Mn, the high-temperature cycling performance, and the high-temperature storage performance in Examples 1~20 and Comparative Examples 1~3 were shown in Table 2.

Table 2 Test results of deposition of metal Mn, high-temperature cycling performance, and high-temperature storage performance in Examples 1~20 and Comparative Examples 1~3.

TABLE 2

| No. | Deposition of metal Mn (ppm) | High-temperature cycling performance (weeks) | High-temperature storage performance (days) |
| --- | --- | --- | --- |
| Example 1 | 193 | 1742 | 158 |
| Example 2 | 182 | 1758 | 160 |
| Example 3 | 170 | 1766 | 161 |
| Example 4 | 163 | 1777 | 162 |
| Example 5 | 148 | 1844 | 168 |
| Example 6 | 141 | 1920 | 175 |
| Example 7 | 136 | 1933 | 176 |
| Example 8 | 129 | 2082 | 189 |
| Example 9 | 165 | 1628 | 148 |
| Example 10 | 143 | 1911 | 174 |
| Example 11 | 178 | 1745 | 159 |
| Example 12 | 185 | 1736 | 158 |
| Example 13 | 198 | 1722 | 157 |
| Example 14 | 211 | 1701 | 155 |
| Example 15 | 191 | 1726 | 157 |
| Example 16 | 166 | 1772 | 161 |
| Example 17 | 168 | 1777 | 162 |
| Example 18 | 173 | 1758 | 160 |
| Example 19 | 177 | 1749 | 159 |
| Example 20 | 171 | 1765 | 160 |
| Comparative Example 1 | 1678 | 777 | 71 |
| Comparative Example 2 | 744 | 1178 | 80 |
| Comparative Example 3 | 950 | 798 | 113 |

As can be clearly seen from the test results of the full-discharge negative-electrode ICP test in the Examples and the Comparative Examples, in contrast with the Comparative Examples, the deposition of the metal Mn in the negative-electrode plate in each of Examples 1-20 was drastically reduced, with slight differences in the deposition of the metal Mn among different coatings of Examples 1-20. Considering that the deposition of the metal Mn mainly originated from the LMO in the positive electrode, it may be considered that after a double-layer coating was applied, the metal release of the LMO positive electrode was significantly mitigated. That was mainly because the high-pH second positive-electrode active material in the second active substance layer had consumed a majority of HF existent in the electrolyte. Due to a lower HF content, the release of metal due to corrosion of LMO by the HF was reduced, thereby greatly improving the high-temperature performance of the LMO plate. On another hand, in the case that the pH value of the second positive-electrode active material in the second active substance layer was too high, the stirring process in the process of preparing the second positive-electrode active material was affected, and the slurry was likely to gel and precipitate. This affected an effective reaction area of the second active substance layer, deteriorated a gas generation problem of the battery, and resulted in poor high-temperature cycling performance and poor high-temperature storage performance. Therefore, the pH value of the second positive-electrode active material needs to be controlled within the range of 10~12.

As can be clearly seen from the test results of the high-temperature cycling performance test and the high-temperature storage performance test in the Examples and the Comparative Examples, in contrast with the Comparative Examples, the high-temperature cycling performance and the high-temperature storage performance of the battery cells in the Examples were significantly improved. As analyzed above, the coating of high-pH NCM811 on LMO greatly consumed the HF in the electrolyte, thereby reducing the metal release of LMO, mitigating the metal deposition on the surface of the negative electrode, reducing decomposition and superficial lithium precipitation of solid electrolyte interphase (SEI) caused by the negative-electrode metal deposition, and improving the high-temperature cycling performance and the high-temperature storage performance of the battery cell.

This application has been disclosed above with reference to exemplary embodiments, but the exemplary embodiments are not intended to limit the claims. Any person skilled in the art can make various modifications and variations to this application without departing from the conception of this application. Therefore, the protection scope of this application shall be subject to the appended claims.

What is claimed is:

1. A positive-electrode plate, comprising a current collector, and a first active substance layer and a second active substance layer that are sequentially disposed on a surface of the current collector, wherein
the first active substance layer comprises a first positive-electrode active material, and the first positive-electrode active material comprises at least one of a compound represented by Formula (I) or a compound represented by Formula (II):

$$Li_{1+x1}Mn_{a1}M_{1-a1}O_{2-y1}A_{y1} \qquad \text{Formula (I)}$$

where $-0.1 \leq x1 \leq 0.2$, $0.5 \leq a1 \leq 1$, $0 \leq y1 < 0.2$, M comprises one or more of Ni, Fe, Cr, Co, Ti, Zn, V, Al, Zr, and Ce, and A comprises one or more of S, N, F, Cl, Br, and I;

$$Li_{1+x2}Mn_{a2}L_{2-a2}O_{4-y2}B_{y2} \qquad \text{Formula (II)}$$

in the Formula (II), $-0.1 \leq x2 \leq 0.2$, $1.5 \leq a2 \leq 2$, $0 \leq y2 < 0.5$, L comprises one or more of Ni, Fe, Cr, Co, Ti, Zn, V, Al, Zr, and Ce, and B comprises one or more of S, N, F, Cl, Br, and I; and
the second active substance layer comprises a second positive-electrode active material having a pH value of from 10 to 12; and the pH value is measured as follows: at 25° C., adding 5 g of a purchased or self-made second positive-electrode active material into 500 ml of deionized water, stirring at a speed of 30 r/min for 2 hours by using a magnetic stirrer, placing into an ultrasonic cleaner to perform ultrasonic treatment for 2 hours, setting aside a homogeneously dispersed solution for 1 hour, and then measuring the pH value of the solution by using a pH tester; and
a specific surface area BET2 of the second positive-electrode active material is not lower than a specific surface area BET1 of the first positive-electrode active material, and $1.2 \leq BET2/BET1 \leq 2$.

2. The positive-electrode plate according to claim 1, wherein the second positive-electrode active material is selected from one or more of lithium iron phosphate, lithium manganese iron phosphate, lithium cobalt oxide, lithium nickel oxide, lithium manganese oxide, lithium nickel manganese oxide, lithium nickel cobalt manganese oxide, or lithium nickel cobalt aluminum oxide.

3. The positive-electrode plate according to claim 2, wherein the second positive-electrode active material comprises other transition metal elements, non-transition metal elements, or non-metal elements than constituent elements of the second positive-electrode active material, wherein the transition metal elements are one or more of Ni, Fe, Co, Zr, Cr, Ti, Zn, and V, the non-transition metal elements are one or more of Al and Ce, and the non-metal elements are one or more of S, N, F, Cl, Br, and I; and/or
wherein the second positive-electrode active material comprises a coating layer disposed on a surface of the second positive-electrode active material, and the coating layer has a material selected from one or more of boron oxide, zirconium oxide, titanium oxide, aluminum oxide, magnesium oxide, or zinc oxide.

4. The positive-electrode plate according to claim 3, wherein the second positive-electrode active material comprises a compound represented by Formula (III):

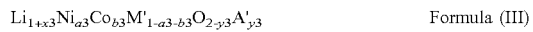

$$Li_{1+x3}Ni_{a3}Co_{b3}M'_{1-a3-b3}O_{2-y3}A'_{y3} \quad \text{Formula (III)}$$

in the Formula (III), $-0.1 \leq x3 \leq 0.2$, $0.5 \leq a3 < 1$, $0 < b3 < 0.5$, $0.7 \leq a3+b3 < 1$, $0 \leq y3 < 0.2$, M' comprises one or more of Mn, Fe, Cr, Ti, Zn, V, Al, Zr, and Ce, and A' comprises one or more of S, N, F, Cl, Br, and I.

5. The positive-electrode plate according to claim 2, wherein the second positive-electrode active material comprises a coating layer disposed on a surface of the second positive-electrode active material, and the coating layer has a material selected from one or more of boron oxide, zirconium oxide, titanium oxide, aluminum oxide, magnesium oxide, or zinc oxide.

6. The positive-electrode plate according to claim 2, wherein the second positive-electrode active material comprises other transition metal elements, non-transition metal elements, or non-metal elements than constituent elements of the second positive-electrode active material, wherein the transition metal elements are one or more of Ni, Fe, Co, Zr, Cr, Ti, Zn, and V, the non-transition metal elements are one or more of Al and Ce, and the non-metal elements are one or more of S, N, F, Cl, Br, and I; and
wherein the second positive-electrode active material comprises a coating layer disposed on a surface of the second positive-electrode active material, and the coating layer has a material selected from one or more of boron oxide, zirconium oxide, titanium oxide, aluminum oxide, magnesium oxide, or zinc oxide.

7. The positive-electrode plate according to claim 2, wherein the second positive-electrode active material comprises a compound represented by Formula (III):

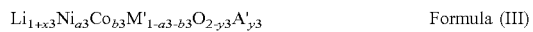

$$Li_{1+x3}Ni_{a3}Co_{b3}M'_{1-a3-b3}O_{2-y3}A'_{y3} \quad \text{Formula (III)}$$

in the Formula (III), $-0.1 \leq x3 \leq 0.2$, $0.5 \leq a3 \leq 1$, $0 < b3 < 0.5$, $0.7 \leq a3+b3 < 1$, $0 \leq y3 < 0.2$, M' comprises one or more of Mn, Fe, Cr, Ti, Zn, V, Al, Zr, and Ce, and A' comprises one or more of S, N, F, Cl, Br, and I.

8. The positive-electrode plate according to claim 1, wherein the second positive-electrode active material comprises a compound represented by Formula (III):

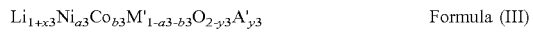

$$Li_{1+x3}Ni_{a3}Co_{b3}M'_{1-a3-b3}O_{2-y3}A'_{y3} \quad \text{Formula (III)}$$

in the Formula (III), $-0.1 \leq x3 \leq 0.2$, $0.5 \leq a3 < 1$, $0 < b3 < 0.5$, $0.7 \leq a3+b3 < 1$, $0 \leq y3 < 0.2$, M' comprises one or more of Mn, Fe, Cr, Ti, Zn, V, Al, Zr, and Ce, and A' comprises one or more of S, N, F, Cl, Br, and I.

9. The positive-electrode plate according to claim 1, wherein a ratio of mass m1 of the first positive-electrode active material per unit area in the first active substance layer to mass m2 of the second positive-electrode active material per unit area in the second active substance layer satisfies: $1 < m1/m2 \leq 19$.

10. The positive-electrode plate according to claim 1, wherein the second positive-electrode active material is a lithium-transition metal composite oxide or a lithium-transition metal composite phosphate having a pH value of from 10 to 12.

11. The positive-electrode plate according to claim 1, wherein the second positive-electrode active material is a lithium-transition metal composite oxide or a lithium-transition metal composite phosphate having a pH value of from 10 to 12.

12. A lithium-ion secondary battery, comprising a casing, a positive-electrode plate, a negative-electrode plate, a separator, and an electrolyte, wherein the positive-electrode plate is the positive-electrode plate according to claim 1.

13. The lithium-ion secondary battery according to claim 12, wherein
the negative-electrode plate has an active material selected from one or more of soft carbon, hard carbon, artificial graphite, natural graphite, silicon, silicon oxide compound, silicon carbon composite, or lithium titanate;
the electrolyte comprises an organic solvent and a lithium salt, wherein the organic solvent is selected from one or more of ethylene carbonate, propylene carbonate, dimethyl carbonate, diethyl carbonate, or ethyl methyl carbonate, and the lithium salt is selected from one or more of $LiPF_6$, $LiBF_4$, LiBOB, $LiAsF_6$, $Li(CF_3SO_2)_2N$, $LiCF_3SO_3$, or $LiClO_4$; and
the separator is selected from one or more of polyethylene, polypropylene, a non-woven fabric, or polyvinylidene fluoride.

14. A battery module, comprising the lithium-ion secondary battery according to claim 1.

15. A battery pack, comprising the battery module according to claim 14.

16. An apparatus, comprising the lithium-ion secondary battery according to claim 12, wherein the lithium-ion secondary battery is used as a power supply of the apparatus.

17. The apparatus according to claim 16, wherein the apparatus comprises a mobile device, an electric vehicle, an electric train, a satellite, a ship, and an energy storage system.

18. The apparatus according to claim 16, wherein the apparatus comprises a mobile device, an electric vehicle, an electric train, a satellite, a ship, and an energy storage system.

19. A manufacturing method of the positive-electrode plate according to claim 1, wherein the method comprises the following steps of:
(1) adding a first positive-electrode active material, a conductive agent, and a binder into an organic solvent, stirring for 60 to 180 minutes with a stirring linear speed controlled within a range of 4 m/min to 12 m/min, and homogeneously mixing to obtain a slurry marked as slurry A;
(2) adding a second positive-electrode active material having a pH value of from 10 to 12, a conductive agent, and a binder into an organic solvent system, and stirring for 60 to 180 minutes with a stirring linear speed controlled within a range of 4 m/min to 12 m/min, and homogeneously mixing to obtain a slurry marked as slurry B; and (3) coating a current collector with the slurry A to form a first active substance layer, coating the first active substance layer with the slurry B to form a second active substance layer, and then drying, cold calendering, slitting, and cutting to obtain the positive-electrode plate, and wherein the first positive-electrode active material comprises at least one of a compound represented by Formula (I) or a compound represented by Formula (II):

$$Li_{1+x1}Mn_{a1}M_{1-a1}O_{2-y1}A_{y1} \quad \text{Formula (I)}$$

wherein $-0.1 \leq x1 \leq 0.2$, $0.5 \leq a1 \leq 1$, $0 \leq y1 < 0.2$, M comprises one or more of Ni, Fe, Cr, Co, Ti, Zn, V, Al, Zr, and Ce, and A comprises one or more of S, N, F, Cl, Br, and I;

$$Li_{1+x2}Mn_{a2}N_{2-a2}O_{4-y2}B_{y2} \quad \text{Formula (II)}$$

in the Formula (II), $-0.1 \leq x2 \leq 0.2$, $1.5 \leq a2 \leq 2$, $0 \leq y2 < 0.5$, L comprises one or more of Ni, Fe, Cr, Co, Ti, Zn, V, Al, Zr, and Ce, and B comprises one or more of S, N, F, Cl, Br, and I; and the second positive-electrode active material having a pH value of from 10 to 12; and the pH value is measured as follows: at 25° C., adding 5 g of a purchased or self-made second positive-electrode active material into 500 ml of deionized water, stirring at a speed of 30 r/min for 2 hours by using a magnetic stirrer, placing into an ultrasonic cleaner to perform ultrasonic treatment for 2 hours, setting aside a homogeneously dispersed solution for 1 hour, and then measuring the pH value of the solution by using a pH tester; and a specific surface area BET2 of the second positive-electrode active material is not lower than a specific surface area BET1 of the first positive-electrode active material, and $1.2 \leq BET2/BET1 \leq 2$.

* * * * *